Dec. 19, 1933.  G. L. MATTHIAS  1,939,859
DRIVING BELT AND METHOD OF MAKING THE SAME
Filed Sept. 27, 1930
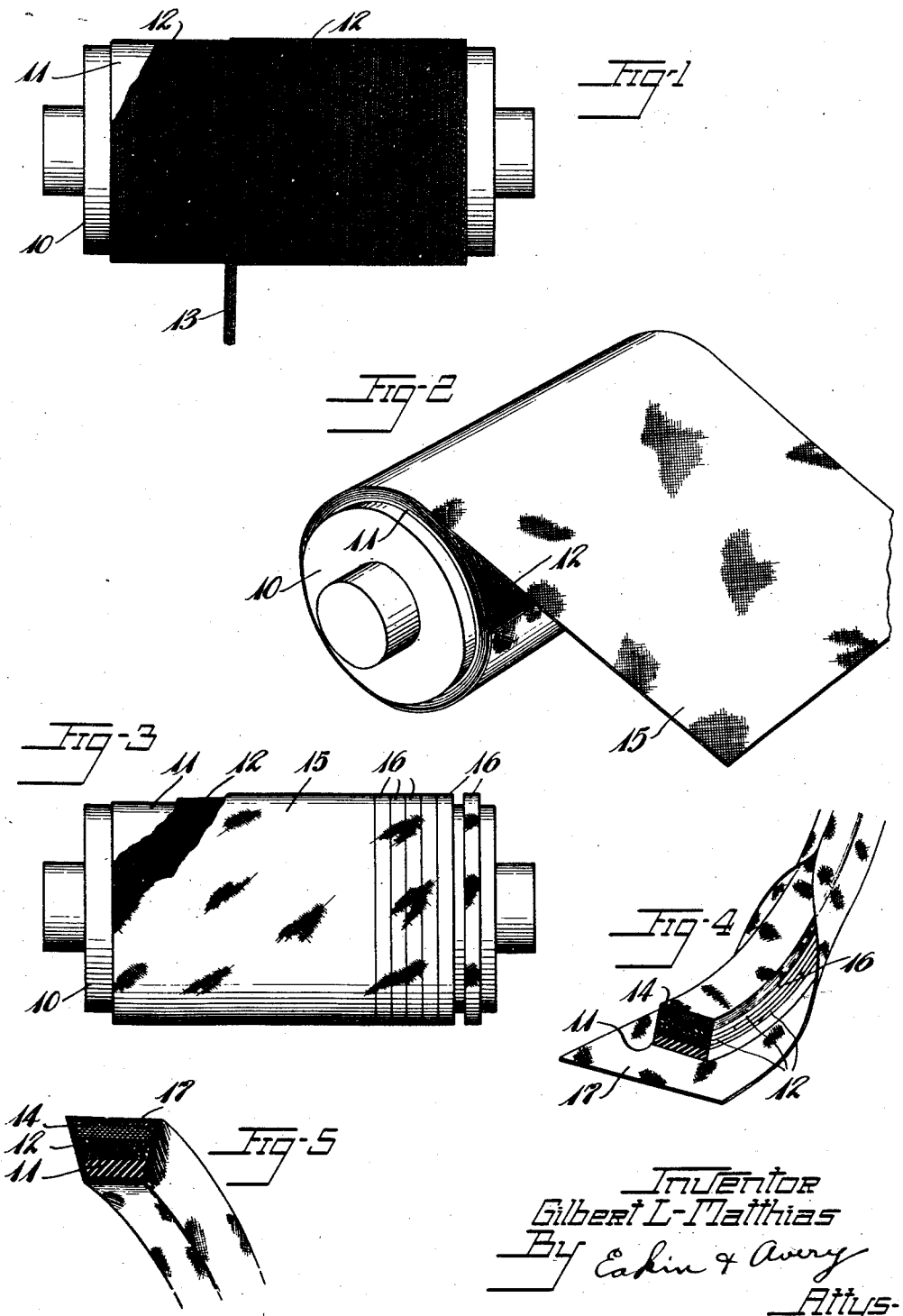
Inventor
Gilbert L. Matthias
By Eakin & Avery
Attys.

Patented Dec. 19, 1933

1,939,859

UNITED STATES PATENT OFFICE 1,939,859

DRIVING BELT AND METHOD OF MAKING THE SAME

Gilbert L. Matthias, Silver Lake, Ohio, assignor to The B. F. Goodrich Company, New York, N. Y., a corporation of New York Application September 27, 1930
Serial No. 484,824

4 Claims. (Cl. 74—63)

This invention relates to driving belts and to methods of making the same, and more especially belts such as the endless side-driving belts used for driving the fans of motor vehicles and comprising a strength-giving element consisting of cord strands disposed longitudinally of the belt. Such elements are usually incorporated in the belts by the relatively slow method of winding a single strand of cord in a plurality of adjacent and overlying convolutions or by winding the cords in the form of a sheet of cord fabric to produce a tubular structure which is later cut to provide a plurality of belts or belt cores. In this latter practice one end of the sheet overlies the other end thereof and the ends of the sheet and the overlapping of them produce an unevenness of surface and a non-uniformity of structure in the individual belts or cores and causes premature failure or improper functioning of the belt at the "splice" or overlap.

The chief objects of this invention are to provide an endless driving belt having uniformity of strength throughout; to provide a cord-reinforced endless belt without objectionably abrupt variations of structure such as that resulting from the winding of the cord fabric as above described; to provide a belt of the character described which may be made by an economical, commercially practical method; and to provide an improved method for the manufacture of such belts.

Of the accompanying drawing:

Fig. 1 is a side elevation of a belt-building form or drum and work thereon in an intermediate stage of manufacture, showing the method of applying the cords to the drum.

Fig. 2 is a perspective view of the drum and work thereon, showing the succeeding step in the manufacture of the belts.

Fig. 3 is a side elevation of the belt-building drum and work thereon showing how the latter is severed into individual belt-cores.

Fig. 4 is a sectional perspective view of a portion of a belt-core and a wrapper therefor showing how the wrapper is applied to the belt-core.

Fig. 5 is a sectional perspective view of a portion of a finished belt embodying my invention in its preferred form.

Referring to the drawing, 10 is a cylindrical drum or form of usual design for the building of a wide, tubular structure of rubber and rubberized fabric which subsequently is transversely severed upon the drum into relatively narrow belt-cores. For convenience, the drum may be rotatably mounted to facilitate the application of belt-building material thereto.

I first apply a relatively thick sheet of unvulcanized rubber composition 11 to the drum and unite its ends in a butt splice. Then I mount upon the layer 11 a plurality of layers or plies 12, 12 of cords in the following manner. A continuous flat strip 13 composed of parallel cord strands arranged side by side and bonded to each other by unvulcanized rubber is attached at one of its ends to the layer 11 at one end of the drum, after which the latter is rotated and the strip 13 fed thereonto at a suitable angle such that it is positioned upon the layer 11 in a succession of laterally abutting helical convolutions which may be rolled down to cause them to adhere to each other. After a layer 12 is applied to the drum, the angle of the strip 13 is reversed with relation thereto, and rotation of the drum is continued to apply another layer 12 upon the first layer. In like manner succeeding layers of cords are applied to the drum until the desired number of layers are in place thereon. The width of the strip 13 determines the angle at which it must lie upon the drum for its margins to abut each other, and preferably its width is less than the width of the belt-cores which are cut from the structure assembled upon the drum so that every cord in the plies 12 will extend somewhat more than once around a belt-core.

After the cord layers 12 are on the drum, they are overlaid with several convolutions 14, 14 of rubberized, square-woven, bias-cut fabric which is applied to the drum as a continuous sheet 15, as the drum is rotated, this step being clearly shown in Fig. 2. After being rolled down, the assembled structure upon the drum is severed, transversely of the axis of the drum, to provide a plurality of individual belt-cores 16, 16 which are then removed from the drum, at the ends thereof, as is clearly shown in Fig. 3. The respective belt-cores 16 are next covered with one or more plies of a wrapper such as the wrapper 17, Fig. 4, consisting of a strip of rubberized, square-woven, bias-cut fabric, which may be continuous for two turns longitudinally about the belt to give a two-ply cover. Preferably, the belt-core is turned inside out, with the layer of rubber 11 upon the outer periphery thereof, for convenience in applying the wrapper. The wrapper is then applied first to the then outer periphery of the core, then folded laterally about the sides of the core and its marginal portions lapped upon the then inner periphery of the core. Then the assembled belt structure is again reversed to restore the original order of its plies, after which it is mounted in a mold and vulcanized by heat and pressure in the usual manner.

The finished belt is shown in Fig. 5, and is an endless driving belt having the advantages above discussed. Each cord of the core extends at least once around the belt, in the preferred embodiment here shown, and the cord ends of each cord ply are uniformly spaced circumferentially of the belt. Although the cords of each ply are disposed at a slight angle with relation to the length of the belt, the cords of adjacent cord plies cross each other and are disposed at equal angles to the length of the belt, with resulting balance of the tension element. The tension element is of uniform thickness throughout, and there is no "splice" or sheet end therein such as to produce a local weakness or destructive abrupt variation of structure in the belt.

My invention may be modified within the scope of the appended claims, as I do not wholly limit the claims to the specific construction shown or exact procedure described.

I claim:

1. An endless transmission belt comprising a plurality of cords lying throughout their length at approximately the same distance from the inner periphery of the belt and approximately lengthwise of the belt but at such a slight angle to the length of the belt that each cord extends at least once around the circumference of the belt and the ends of each cord lie adjacent the respective sides of the belt.

2. An endless transmission belt comprising a plurality of cords lying throughout their length at approximately the same distance from the inner periphery of the belt and approximately lengthwise of the belt but at such a slight angle to the length of the belt that each cord extends at least once around the circumference of the belt and the ends of each cord lie adjacent the respective sides of the belt, the ends of the cords being uniformly spaced apart longitudinally of the belt.

3. An endless transmission belt comprising a layer of cords lying throughout their length at approximately the same distance from the inner periphery of the belt and approximately lengthwise of the belt but at such a slight angle to the length of the belt that each cord extends at least once around the circumference of the belt and the ends of each cord lie adjacent the respective sides of the belt and a second layer of cords likewise disposed but crossing the cords of the first layer.

4. A belt as defined in claim 3 in which the ends of the cords of each layer are uniformly spaced apart lengthwise of the belt.

GILBERT L. MATTHIAS.